US010632477B2

(12) United States Patent
Riera-Domenech (10) Patent No.: US 10,632,477 B2
(45) Date of Patent: Apr. 28, 2020

(54) SUPERCENTRIFUGE WITH A PISTON DRIVEN BY A PRESSURIZED FLUID FOR THE EXTRACTION OF SOLIDS AND PROCESS FOR EXTRACTING THE SAME

(71) Applicant: Riera Nadeu, S.A., Granollers (Barcelona) (ES)

(72) Inventor: Marc Riera-Domenech, Barcelona (ES)

(*) Notice: Subject to any disclaimer, the term of this patent is extended or adjusted under 35 U.S.C. 154(b) by 45 days.

(21) Appl. No.: 14/907,068

(22) PCT Filed: Jul. 23, 2014

(86) PCT No.: PCT/ES2014/070599
§ 371 (c)(1),
(2) Date: Jan. 22, 2016

(87) PCT Pub. No.: WO2015/011329
PCT Pub. Date: Jan. 29, 2015

(65) Prior Publication Data
US 2016/0144382 A1    May 26, 2016

(30) Foreign Application Priority Data

Jul. 23, 2013 (ES) .................................. 201331124

(51) Int. Cl.
| *B04B 11/08* | (2006.01) |
| *B04B 1/02* | (2006.01) |
| *B04B 11/05* | (2006.01) |
| *B04B 15/06* | (2006.01) |
| *B01D 21/26* | (2006.01) |
| *B04B 5/04* | (2006.01) |

(52) U.S. Cl.
CPC ............ *B04B 11/08* (2013.01); *B01D 21/262* (2013.01); *B04B 1/02* (2013.01); *B04B 11/05* (2013.01); *B04B 15/06* (2013.01); *B04B 2005/0485* (2013.01)

(58) Field of Classification Search
CPC .......... B04B 1/02; B04B 11/05; B04B 15/06; B04B 11/08; B04B 2005/0485; B01D 21/262
USPC ...................................................... 494/27, 37
See application file for complete search history.

(56) References Cited

U.S. PATENT DOCUMENTS 6,123,655 A * 9/2000 Fell ...................... A61M 1/3693
494/50
6,632,166 B2 * 10/2003 Carr .......................... B04B 9/08
210/376

(Continued)

FOREIGN PATENT DOCUMENTS

| ES | 201130674 A2 | 4/2011 | |
| WO | WO 2010076657 A2 * | 7/2010 | ............... B04B 7/12 |

*Primary Examiner* — Charles Cooley
(74) *Attorney, Agent, or Firm* — Eugenio J. Torres-Oyola; Victor M. Rodriguez-Reyes; Rafael Rodriguez-Muriel (57) ABSTRACT

A supercentrifuge with a non-intrusive device for the extraction of solids, the supercentrifuge comprising a chamber or rotor for the clarification of liquids and a piston located within the chamber passing through it in order to discharge the solids, the piston being driven in its outward travel along the chamber by the injection of a pressurised fluid which pushes the piston, in which the supercentrifuge has a pneumatic pumping system for the generation of vacuum to bring about return movement of the piston along the chamber.

13 Claims, 5 Drawing Sheets

(56) References Cited

U.S. PATENT DOCUMENTS

| | | | | |
|---|---|---|---|---|
| 6,733,433 B1* | 5/2004 | Fell | | A61M 1/3693 |
| | | | | 435/2 |
| 6,776,752 B2* | 8/2004 | Carr | | B04B 1/02 |
| | | | | 210/376 |
| 6,986,734 B2* | 1/2006 | Carr | | B04B 1/02 |
| | | | | 210/376 |
| 7,052,451 B2* | 5/2006 | Carr | | B04B 11/05 |
| | | | | 210/376 |
| 7,261,683 B2* | 8/2007 | Carr | | B04B 11/05 |
| | | | | 210/376 |
| 7,618,361 B2* | 11/2009 | Carr | | B04B 11/05 |
| | | | | 210/376 |
| 7,628,749 B2* | 12/2009 | Carr | | B01D 21/0012 |
| | | | | 210/376 |
| 7,935,042 B2* | 5/2011 | Carr | | B04B 11/05 |
| | | | | 210/376 |
| 8,475,352 B2* | 7/2013 | Carr | | B04B 7/12 |
| | | | | 494/45 |
| 10,449,555 B2* | 10/2019 | Carr | | B04B 11/08 |
| 2003/0195105 A1* | 10/2003 | Carr | | B04B 1/02 |
| | | | | 494/38 |
| 2005/0009681 A1* | 1/2005 | Carr | | B04B 1/02 |
| | | | | 494/46 |
| 2005/0233882 A1* | 10/2005 | Carr | | B04B 11/05 |
| | | | | 494/50 |
| 2005/0233883 A1* | 10/2005 | Carr | | B04B 11/05 |
| | | | | 494/50 |
| 2007/0049479 A1* | 3/2007 | Carr | | B04B 11/05 |
| | | | | 494/23 |
| 2007/0114161 A1* | 5/2007 | Carr | | B01D 21/0012 |
| | | | | 210/96.2 |
| 2010/0029457 A1* | 2/2010 | Carr | | B04B 11/05 |
| | | | | 494/8 |
| 2010/0167899 A1* | 7/2010 | Carr | | B04B 7/12 |
| | | | | 494/4 |
| 2016/0144382 A1* | 5/2016 | Riera-Domenech | | B04B 1/02 |
| | | | | 494/27 |

* cited by examiner

SUPERCENTRIFUGE WITH A PISTON DRIVEN BY A PRESSURIZED FLUID FOR THE EXTRACTION OF SOLIDS AND PROCESS FOR EXTRACTING THE SAME

BACKGROUND OF THE DISCLOSURE

1. Field of the Disclosure

This invention relates to a tubular rotor supercentrifuge for the clarification of a liquid, or the separation of two non-miscible liquids and a solid, which has a system for automatic discharge of the solids retained.

2. Description of Related Art

This invention applies particularly to supercentrifuges.

By supercentrifuge is meant a centrifuge operating at speeds between 15,000 and 30,000 g, preferably between 15,000 and 20,000.

Tubular rotor centrifuges for the settling of solid particles (clarification of liquid) in which solids are retained within the rotor and have to be periodically extracted by hand are known.

These centrifuges clarify and separate liquids with a low solids content and work continuously until the retained solids fill the rotor. It is then necessary to stop the machine and dismantle the rotor with tools provided for the purpose in order to empty the rotor manually or using cleaning means outside the machine.

In order to empty known supercentrifuges operations have to be carried out for manual removal of the solids; this requires work by specialist personnel and does not avoid contact between operators and API (Active Pharmaceutical Ingredients), Super-API, hazardous materials, etc.; there are also processes for emptying by scraping out the product through external mechanical action.

It is therefore desirable to automate the process of emptying out the solids retained within the rotor in each supercentrifuging cycle, that is to say when the rotor becomes filled with solids within the centrifuge itself.

Patent Document PCT WO03/086641 discloses a supercentrifuge with automatic extraction of the retained solids through a piston operated from the exterior by means of one or more hydraulic cylinders in an intrusive way. In this supercentrifuge an object outside the rotor enters the chamber to push the piston. As a consequence this is especially inconvenient in particular applications because of possible contamination associated with the use of an external element to provide thrust to the piston, as it is not possible to ensure that there will be no particles in the device.

The availability of a supercentrifuge with automatic non-intrusive discharging of solids would provide an opportunity for processes for discharging the solids and would assist cleaning and sterilisation of all parts in contact with the product, without any operation of opening up the machine and dismantling the rotor. As no external elements or personnel are involved, sterile working, the safety of such personnel and traceability of the process would be guaranteed.

Documents ES2403140A1, US200749479A1 and US2010167899 disclose a supercentrifuge having a non-intrusive device for the extraction of solids in which the piston is located within the rotor and is operated through the injection of pressurised air or gas in its movements along the rotor, both outwards to discharge the solids and on returning to start a new cycle. This comprises a complex system of inlets and outlets to and from the chamber, and also comprises a conduit or conduits through the piston to allow the extraction of the clarified liquid free of solids from said chamber. Said documents US200749479A1 and US2010167899 also discloses, according to the pre-characterising clause of claim 1, a supercentrifuge in which said conduit or conduits are alternatively opened and closed by a valve placed on the piston, allowing the pass of clarified liquid and blocking the pass of pressurized air or gas when necessary.

On said documents the pressurized air or gas is injected to chamber from one end of said chamber to push the piston to the opposed end, and from the opposed end to push the piston back to the initial position, so both ends of the chamber, placed on opposed sides of the piston, should be hermetically sealed allowing its pressurization. This feature increases the cost and complicates the production, maintenance and operation of the apparatus.

The supercentrifuge in ES2403140A1 has the advantage over that in WO03086641 that it has no intrusive elements because the piston is operated not by mechanical means, but by pneumatic means.

Operation using pressure to drive the piston upwards from the bottom of the centrifuge has the disadvantage that the requirements associated with the excess pressure required to drive the piston from beneath have to be considered, making design of the extraction of supernatant liquid and solids from the bottom flexible.

Document FR2161657 mentions an inlet valve to a vessel in a conduit for the transport of liquid transporting flammable liquid continuously. Liquid/gas separation takes place within the vessel. This separator has no pistons, the valves in the vessel being flotation valves. Unlike what happens with pistons which clean centrifuges, the inlet valve operates perpendicularly to the force of the flow. The valve is operated in one direction through the force of a spring and by an intrusive mechanical actuator in the other. This mechanical actuator is in turn operated by the pressure difference caused by the Venturi effect in the flow. Thus the valve requires flow in order to operate. The two-way operation of the valve is mechanical and intrusive. In addition to this, the inlet valve mechanically complicates the device.

Document U.S. Pat. No. 6,123,655 describes a centrifuge apparatus for separating the blood into its sub-components through a batch centrifugation process. The apparatus allow to separate liquid fractions of a small blood batches (typically 500 ml of blood donated by one person) at not supercentrifuge spin rate, and therefore without producing an accumulation of solid blood fraction on the chamber perimeter walls and not requiring further cleaning operations.

According to U.S. Pat. No. 6,123,655 the centrifugation processing chamber is provided by a piston placed within it, used to adapt the volume of the chamber to the butch size. It can therefore process a variable quantity of biological fluid, even down to very small quantities. Said piston can be moved along said chamber pushed by means of pressurized air or gas injected into the chamber from one end and can be moved in opposed direction by means of vacuum applied into said chamber from same end of the chamber. So the chamber is divided by said piston (devoid of conduits) into two different and not communicated sides. One upper side include one blood entrance/exit, so it should be hermetically closed in order to prevent blood leaking during the centrifugation operations and during the chamber filling and emptying operations. One lower side of the chamber include a connection for the vacuum and pressurized air or gas injection, so said lower side of the chamber should also be hermetically closed.

SUMMARY OF THE DISCLOSURE

One object of this invention is to provide a supercentrifuge of lighter and simpler construction than those previously known.

In order to accomplish this aim this invention comprises a supercentrifuge with a non-intrusive device for the extraction of solids, the centrifuge comprising:

a rotor with perimeter walls and with the piston located within, said piston dividing the rotor into one upper side and one lower side, wherein the lower side is a chamber for the clarification of liquids separating solid particles and clarified liquid, the bottom end of said chamber including an outlet opening for the discharge of residual or supernatant liquid through the action of gravity;

the upper side of the rotor includes a hermetically sealable clarified fluid outlet, allowing the extraction of the clarified fluid from the rotor when open and the hermetic sealing of the upper side when closed, and a gas passage connected to a pneumatic pumping system which provides pressurized gas or vacuum injectable or applicable the upper side or the rotor through said passage to produce the vertical movement of the rotor in a bidirectional path along the rotor to automatic discharge of solid particles settled and retained within the chamber of the lower side through the outlet opening after a filling and clarification cycle;

the piston has a valve, said valve providing access to a conduit or conduits passing through the piston to allow the clarified liquid free of solids to pass from the chamber of the lower side to the upper side through the piston and thereby allowing the extraction of the clarified liquid from said chamber;

the supercentrifuge further comprising a lower injector arranged outside the rotor and oriented in an upward non-vertical direction for the projection from the outside of the rotor of a jet of liquid requiring clarification to the inside the chamber through said outlet opening.

In an especially advantageous manner, both the injection of pressurized gas for outward travel of the piston and the vacuum for return act directly on the piston without intermediate mechanical action.

The passage or channel of the upper side of the rotor through which pressure is applied allows the outward movement of the piston producing the discharge of the solids settled in the chamber during its rotation, and allows its return movement applying vacuum to the upper side through said passage or channel. This passage may be provided along the axis or in any other position.

Also, preferably the outlet opening placed in the bottom end of the rotor has no leak tight seal, communicating the chamber with the atmospheric pressure preventing the pressurization of said chamber and definitely simplifying the machine.

According to another embodiment of the present invention the lower injector does not interfere with the vertical projection of the opening, so that the discharge of residual or supernatant liquid by gravity and the discharge of solid particles by the piston through the outlet opening does not interfere with said lower injector.

The piston has a single central valve providing access to a conduit or conduits passing through the piston to allow the passage of clarified liquid free of solids. Preferably this valve is open when the piston is at the start of its outward movement and has a spring which causes it to close when the piston is driven by the pressurised fluid to discharge the solids. In an even more advantageous manner the valve is open when the piston is on its outward journey and the effect of the pressurised fluid causes the piston to move to discharge the solids.

Advantageously the pressurised fluid is air that is free of pyrogens.

Preferably the piston and the rotor or chamber are made of a suitable preferably inert material, for example stainless steel with corresponding sealing and leakproofing components which fit the internal surface of the rotor.

Additionally the supercentrifuge may have a tubular cooling and/or heating jacket outside the chamber.

The rotor comprises a single outlet opening for the discharge of supernatant liquid and the separated solids in its lower portion.

More preferably below the bottom end of the rotor there is an end member movable between a first position in which a first end of tubular conduit included in the end member is vertically aligned with the outlet opening for the discharge of supernatant liquid through said tubular conduit, and a second position in which the end member is separated from the outlet opening and from the vertical projection thereof to allow the solids to be discharged directly from the rotor without passing through the tubular conduit. Said end member is preferably pivoting around an articulation.

Optionally the lower injector can be attached to the end member, so that when in the first position said lower injector is placed for the projection of a jet of liquid inside the chamber through said outlet opening, and when in the second position the lower injector is accessible for cleaning operations of said lower injector.

Preferably it has a system of in-situ CIP (clean in place) and SIP (steam in place) cleaning/sterilisation circuits.

More preferably the system with in-situ cleaning/sterilisation circuits comprises sprays located outside the chamber.

The at least one spray can be the lower injector, which will alternatively act as injector for the liquid to be clarified and as spray for cleaning.

The supercentrifuge to which this invention relates is useful for the clarification and separation of liquids, especially liquids having a low solids content (that is to say its field of application is the same as that of conventional supercentrifuges). The supercentrifuge to which this invention relates works continuously with the clarified liquid being discharged via the upper outlet from the rotor until it is filled with solids.

Typically, when the volume of solids present in the supercentrifuge reaches a particular level (or what is the same thing, reaches a particular volume) the supercentrifuge is automatically stopped and the process of automatically discharging the supernatant liquid and the retained solids is begun.

In order to achieve this, the piston is moved to the bottom once rotation of the supercentrifuge has completely stopped. The bottom of the supercentrifuge has an opening for the discharge of solids. It may be possible for the supernatant liquid to have been previously discharged by gravity via the same bottom orifice of the rotor, and through opened liquid outlet and conduit.

As the piston is moved by compressed air (or gas for the purpose) the walls of the rotating cylinder are swept.

Return of the piston to the top position, which is the normal working position when the supercentrifuge is rotating, is characteristically brought about according to this invention by applying vacuum to the top surface of the piston.

The pressurised air or gas may be introduced via the axis of the supercentrifuge. Advantageously, the pressurized air or gas is introduced through the outlet for the clarified liquid from the rotor. Vacuum is applied via the same route.

Application of vacuum for return of the piston to the top working position avoids the need to provide the centrifuge with a hermetic seal at the bottom end of the machine, as is the case in the known state of the art. This seal is necessary so that an antagonistic pressure, that is to say one acting in an opposite direction, causing the piston to move downwards, has to be applied in order to return the piston to its top working position.

Another advantage of this invention is the possibility of having a single central valve in the piston which allows the clarified liquid (that is to say, free of solids) to pass to the outlet collectors via the piston conduit or conduits.

Preferably this invention provides for a system of electrically-operated valves for the automatic control of supercentrifuging (clarification or separation and clarification), discharging solids and returning the piston to the top position.

Preferably filling and feeding with the liquid which has to be clarified takes place via the bottom of the rotor as in conventional supercentrifuges.

Application of pressure and vacuum to the top of the rotor to move the piston makes it unnecessary to fit sealing systems at the bottom, avoiding complications and more expense for the system.

This advantage means that this invention can if desired be applied to existing supercentrifuges which do not have the hermetic seal mentioned, a possible application which is not available in the pneumatic systems for operating the piston at present known.

This invention also comprises a process for the automatic extraction of solids from the supercentrifuge with at least one solids outlet which comprises the stages of:
clarifying/separating the liquid;
discharging or draining off the supernatant liquid;
discharging solids via the piston;
repositioning the piston in its initial position;
rotation of the rotor (clarification/separation chamber) is stopped and an outlet for the residual liquid is opened during the stage of discharging or draining;
air or compressed gases are injected, causing the piston to push out the solids located within the walls of the chamber through the solids outlet;
characterised in that
during the return stage vacuum is applied so that the piston returns to its initial position as a result of such vacuum.

BRIEF DESCRIPTION OF THE DRAWINGS

For a better understanding, drawings of an embodiment of the supercentrifuge according to this invention are provided by way of an explanatory but non-limiting example.

DETAILED DESCRIPTION OF THE DISCLOSURE

Figure 1:
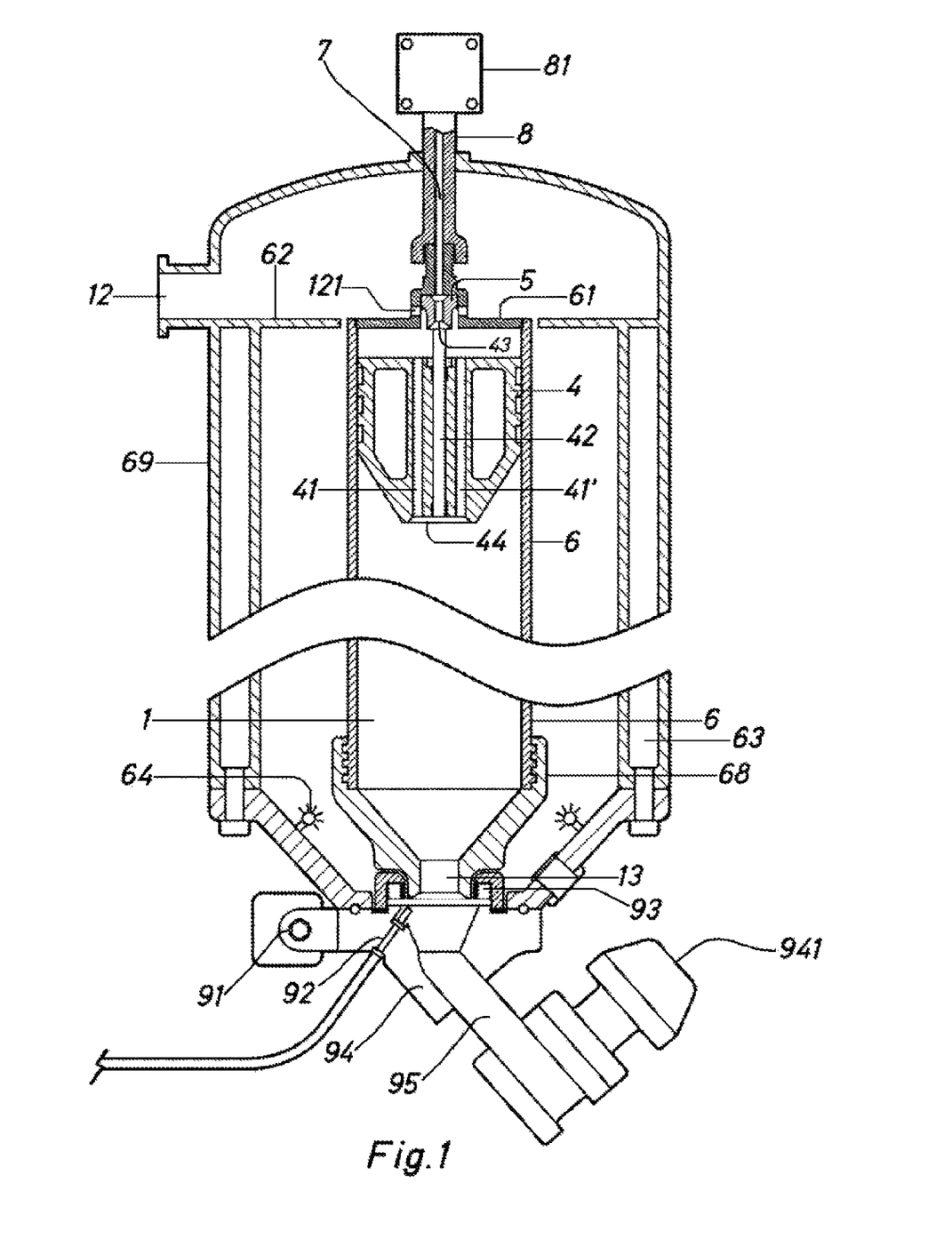
FIG. 1 shows a cross-sectional view of a supercentrifuge (the central part of the rotor has been omitted for clarity).

FIG. 1 shows a supercentrifuge having a rotary rotor or clarification chamber -1- in which there is a piston -4- to discharge solids. Liquid may be fed to the clarifier through the bottom of the rotor in this case, as in conventional centrifuges.

Operation of the supercentrifuge is based on the use of the rotational energy produced by a motor (not shown) to cause rotor (chamber) -1- to rotate. Movement caused by the motor is transmitted through the rotor via a bearing -81- and a shaft -8-. The action of centrifugal force causes the clarified liquid to be discharged via the top, through passage conduits -41-, -41'- provided in the piston and clarified fluid outlets -121-, -12- to the exterior. Outer body -69- is fixed, that is to say it does not rotate in the same way as rotor -1- and has a top partition wall -62- which fits the top -61- of rotary chamber -1-. In this way the region through which the clarified fluid is discharged to the exterior (outlets -121- from the chamber and -12- to the exterior) is separate from the rest of the intermediate space between chamber -1- and body -69-.

Shaft -8- has within it a passage or channel -7- through which pressurised air/gas is injected to cause piston -4- to descend, or through which vacuum is applied to cause it to ascend. A suitable pneumatic/pumping system will be provided for this purpose. Alternatively passage -121- may be used for the injection of air/gas and, if appropriate, the subsequent vacuum.

Rotor -1- is located within body -69- which in turn has a cooling/heating jacket -63-. Between wall -6- of rotor -1- and the inner wall of the body there is an in-situ CIP/SIP cleaning/sterilisation system -64-.

The thrust of piston -4- is brought about by the injection of pressurised air or gases without the assistance of any intrusive mechanical means. The compressed air moves the piston longitudinally along rotor -1- displacing the solids present on the periphery of the separation chamber. The piston has a geometry such that it fits the shape of the bottom -68- of rotor -1-, in the lowermost portion of which there is an outlet for solids -13- to ensure that all the solids in chamber -1- are pushed out and extracted. The rotor has an anti-friction guide ring -93- beneath.

Piston -4- is pushed, preferably by normal or filtered compressed air or gases (free of pyrogens in pharmacy and biotechnology processes) and pushes the solids to solids outlet -13-. Piston -4- also has sealing and friction rings to ensure that the solids are swept out.

Figure 2:
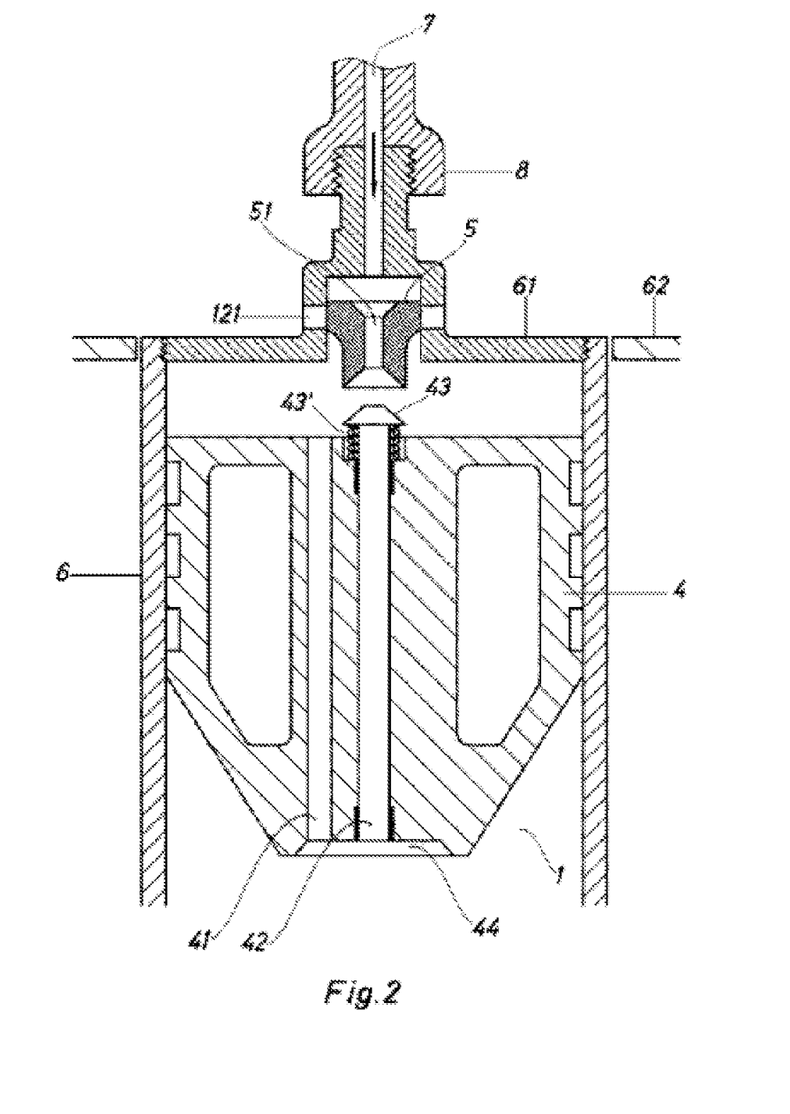
FIG. 2 shows a cross-sectional view of the top of a supercentrifuge according to this invention with the piston valve in the closed position.
Figure 3:
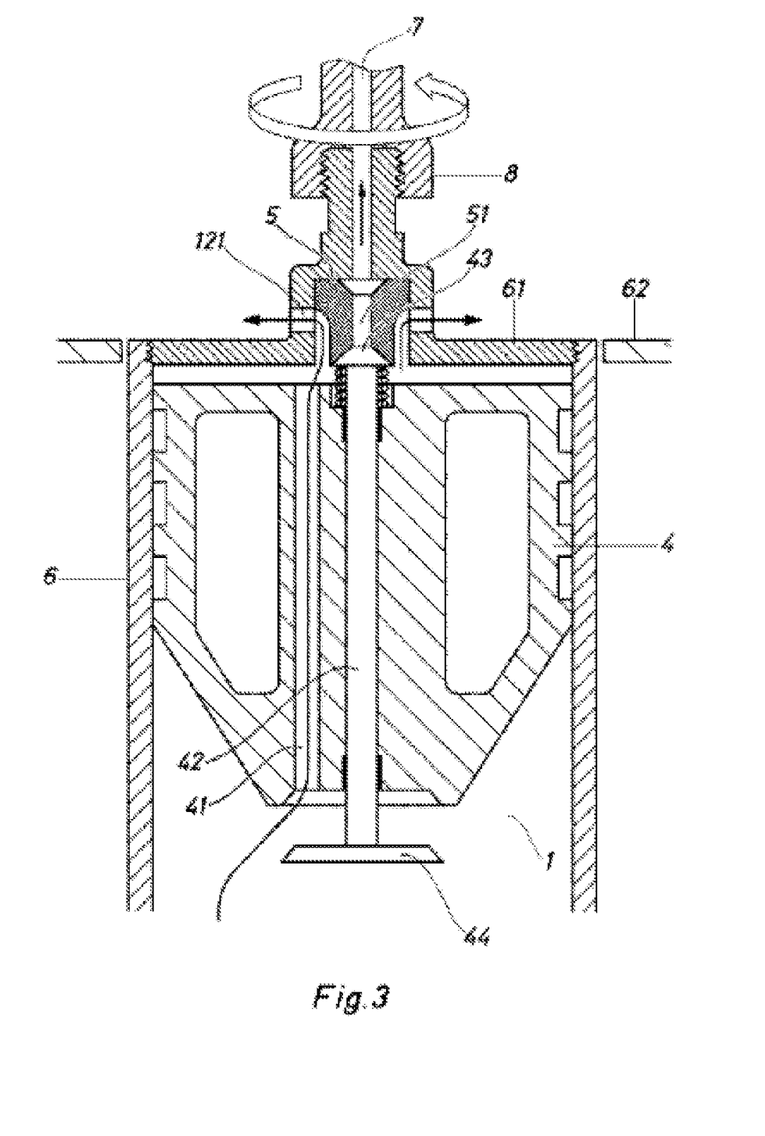
FIG. 3 shows a cross-sectional view of the top of a supercentrifuge according to this invention, similar to that in FIG. 2, but with the piston valve in the open position.

FIGS. 2 and 3 show the top part of the supercentrifuge at two different moments during operation.

FIG. 2 shows the top part of the supercentrifuge at an initial moment in which pressurised air or gas is injected via channel -7- and piston -4- is beginning to move downwards. The centrifuge was previously stopped. The injected compressed air or gas causes the piston to move along the chamber pushing the solids from the periphery of the chamber to solids and supernatant liquid outlet -13- located at the bottom of the chamber. The design may also be adjusted so that injection is performed via channel -121-.

If injection takes place through channel -7-, top distribution piece -5- falls to its bottom end position, also assisted by the injected air or gas, in such a way that it obstructs clarified fluid outlet -121- while it allows pressurised fluid to pass through it through central opening -51-. For its part, valve stem -42-, and valve head -44- in the piston are in the closed position thanks to the force of antagonistic spring -43'-associated with valve actuator -43-. Through conduits -41-, -41'- are closed off in this way.

For its part, FIG. 3 shows a situation with piston -4- in its top position. This position arises when vacuum is applied through channel -7- and/or chamber -1- is rotating. Piece -5- has risen and allows free passage to clarified fluid outlet -121-. When actuator -43- reaches the return top before the rest of piston -4- it enables valve stem -42-, and valve head -44- to open, leaving the way free for clarified liquid present beneath the piston. This clarified liquid can be discharged to the exterior via piston conduits -41- (the number of which may vary but is preferably three) and clarified fluid outlet -121-.

Figure 4:
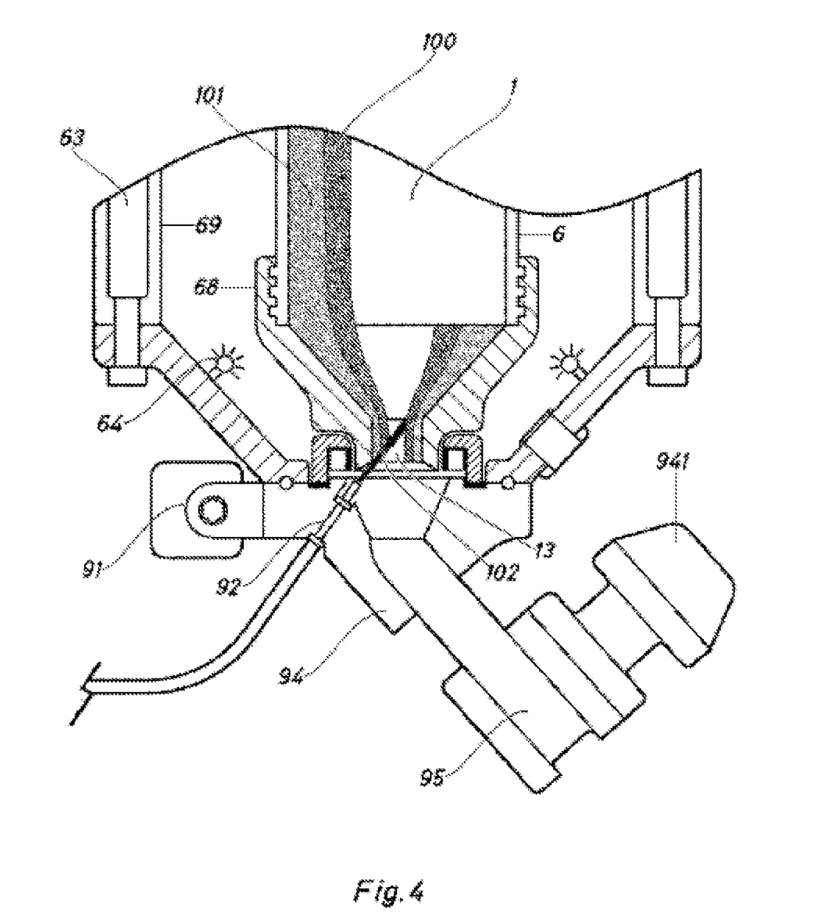
FIG. 4 shows a cross-sectional view of the bottom part of a supercentrifuge according to this invention with the regulator at the bottom in the closed position (position for the discharge of supernatant liquid).
Figure 5:
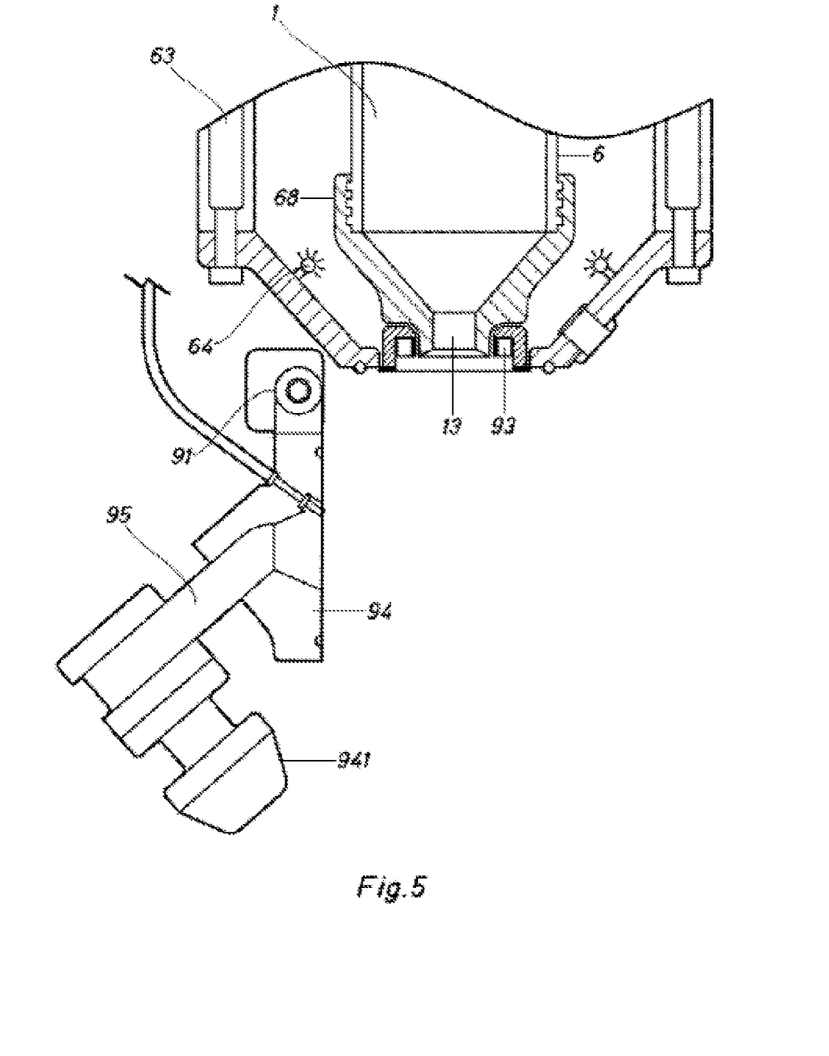
FIG. 5 shows a cross-sectional view of the bottom part of a supercentrifuge according to this invention similar to that in FIG. 4, but with the regulator at the bottom in the open position (position for the discharge of solids).

FIGS. 4 and 5 show a detail of the bottom part of the centrifuge. As will be seen, the centrifuge has an end piece -94- beneath with a conduit -95- for the discharge of residual liquid or supernatant liquid which has not been discharged via upper outlet -121- for clarified liquid. Liquid still present in chamber -1- is allowed to leave through the action of gravity via the conduit for the discharge of supernatant liquid -95- before piston -4- is caused to move downwards. End piece -94- may be accessible and in this case it may open through an articulation -91- and its corresponding control -941-. On opening, the outlet conduit for supernatant liquid is disconnected from lower outlet -13- in such a way that solids are allowed to be discharged via the same lower outlet -13-, for example to a container located beneath lower outlet -13-. As will be seen, lower outlet -13- is the outlet for both supernatant fluid and solids.

The system also comprises a lower injector -92- strategically situated for the entry of liquid -102- requiring clarification, and if necessary for blowing and cleaning.

FIG. 4 shows the end of the feeding stage and the draining stage. In this figure the rotor has stopped rotating. Through the action of gravity residual or supernatant liquid -100- flows through outlet -13- and conduit -95-, while solids -101- are retained on the walls of the rotor. Once the supernatant liquid has drained away the stage of emptying is begun.

FIG. 5 shows the stage of discharging the solids. In this stage lower end piece -94- is open. As the piston descends (not shown) solids are expelled from rotor -1- via lower outlet -13-.

The figures show an embodiment in which air injection and the creation of vacuum takes place via channel -7-. It is also possible for such injection and the vacuum to be applied making use of clarified fluid outlet -121-, which simplifies the construction of the device, and in particular upper distribution piece -5-.

The materials used to manufacture the components of the centrifuge according to this invention, their shapes and dimensions and all accessory details which may be present are independent of the subject matter of the invention, provided that they do not affect its essential nature.

The supercentrifuge is supplemented with an electronic control system to automate the processes, with a position detector for the piston and a corresponding programmable control and operation panel. The system of electrically operated valves (not shown in the figures) for automatic control of the processes can be controlled from the control panel.

Among other advantages, the invention does not require sealing systems at the bottom of the centrifuge, simplifying construction of the top. It also has the advantage that it permits monoblock-type transportable construction. Another advantage is the possibility that there may be only one central valve in the piston.

Specifically, as may be seen from the above figures, the process for extracting the solids comprises the stages of:
  clarifying/separating the liquid;
  stopping the rotor and opening the residual or supernatant liquid outlet;
  draining off the supernatant liquid;
  opening the bottom part -94- of the chamber;
  lowering piston -4- to discharge solids via lower outlet -13- through injection of compressed air or gas, piston -4- pushing out the solids located on the walls of the rotor; and
  returning piston -4- by applying vacuum to the top of piston -4- via hole -7-.

Although the invention has been described with reference to preferred embodiments, these are not to be regarded as restricting the invention, which will be defined by the broadest interpretation of the following claims.

What is claimed is:

1. A supercentrifuge with a piston driven by a pressurized fluid, the supercentrifuge comprising:
  a rotor with perimeter walls and with the piston located therein, said piston dividing the rotor into one upper side and one lower side, wherein
  the lower side is a chamber for the clarification of liquids separating solid particles and clarified liquid, the bottom end of said chamber including an outlet opening for the discharge of residual or supernatant liquid through the action of gravity and the outlet opening of the chamber defining a vertical projection;
  the upper side of the rotor includes a hermetically sealable clarified fluid outlet movable between an open position which allows the extraction of the clarified fluid from the chamber and a closed position in which produces the hermetic sealing of the upper side
  the upper side of the rotor further includes a gas passage connected to a pneumatic pumping system which provides pressurized gas injectable to the upper side of the rotor through said gas passage to produce outward movement of the piston along the rotor toward the outlet opening of the rotor for automatic discharge of solid particles settled and retained within the chamber of the lower side through the outlet opening after a clarification and filling cycle, and which pneumatic pumping system provides vacuum applicable to the upper side of the rotor through said gas passage to produce an ascending movement of the piston;
  the piston has a valve, said valve providing access to a conduit or conduits passing through the piston to allow the clarified liquid free of solids to pass from the chamber of the lower side to the upper side through the piston and thereby allowing the extraction of the clarified liquid from said chamber;
  the supercentrifuge further comprising a lower injector outside the rotor arranged in a non-interfering position with the vertical projection of the outlet opening of the chamber and oriented in an upward, non-vertical direction for the projection from the outside of the rotor of a jet of liquid requiring clarification to the inside the chamber through said outlet opening in an injection step, the non-interfering position of the lower injector permitting the discharge of residual or supernatant liquid by gravity through the outlet opening without interfering with said lower injector in a supernatant discharge step.

2. The supercentrifuge according to claim 1 wherein said valve which provides access to the conduit or conduits passing through the piston is a single valve and is placed in a central position of the piston.

3. The supercentrifuge according to claim 1, wherein the valve which provides access to the conduit or conduits passing through the piston is open when the piston is at a top position and is provided with a spring which causes the valve to close when the piston is in a outward travel to discharge the solids, driven by the pressurised fluid.

4. The supercentrifuge according to claim 3 wherein the valve comprises a valve head on the lower side of the piston, a valve actuator on the upper side of the piston and a valve stem connecting the valve head and the valve actuator through the piston, the spring being associated with the valve actuator to urge the valve head to a closed position, and the valve actuator being configured to reach a top position before a rest of the piston during the ascending movement of the piston, producing the opening of the valve head through the valve stem when the piston reaches said top position, leaving way free for clarified liquid present beneath the piston.

5. The supercentrifuge according to claim 1, wherein the pressurized fluid is air or gases free of pyrogens.

6. The supercentrifuge according to claim 1, wherein the piston and the rotor are made of an inert material, or stainless steel, and wherein the piston has sealing and leak proofing elements which fit the internal surface of the rotor.

7. The supercentrifuge according to claim 1, wherein the exterior of the rotor has a tubular cooling and/or a heating jacket.

8. The supercentrifuge according to claim 1, wherein the rotor is located within an outer body, the outlet opening of the chamber is accessible through a bottom end of the outer body, and wherein below the bottom end of the outer body there is an end member including a tubular conduit, said end member being pivotable around an articulation between a first position in which a first end of the tubular conduit is vertically aligned with the outlet opening of the chamber for the discharge of supernatant liquid through said tubular conduit, and a second position in which the end member is separated from the outlet opening and from the vertical projection thereof for the discharge of solids directly from the rotor without passing through the tubular conduit, leaving the outlet opening of the chamber accessible from outside the outer body.

9. The supercentrifuge according to claim 8 wherein the lower injector is attached to the end member, so that when in the first position said lower injector is placed for the projection of a jet of liquid inside the chamber through said outlet opening, and when in the second position the lower injector is accessible for cleaning operations.

10. The supercentrifuge according to claim 1, wherein the supercentrifuge has a system of in-situ cleaning/sterilisation circuits.

11. The supercentrifuge according to claim 1, wherein the supercentrifuge has a system of in-situ cleaning/sterilization circuits comprising at least one spray located outside the rotor.

12. The supercentrifuge according to claim 11 wherein the at least one spray is the lower injector.

13. The supercentrifuge according to claim 1 wherein the outlet opening of the chamber lacks a leak tight seal, thereby communicating the chamber with the atmospheric pressure.

* * * * *